United States Patent
Saib

(10) Patent No.: US 6,317,706 B1
(45) Date of Patent: Nov. 13, 2001

(54) SIMULATION DEVELOPMENT TOOL FOR AN EMBEDDED SYSTEM

(75) Inventor: Joseph Saib, Englewood, CO (US)

(73) Assignees: Sony Corporation, Tokyo (JP); Sony Electronics, Inc., Ridge Park, NJ (US)

( * ) Notice: Subject to any disclaimer, the term of this patent is extended or adjusted under 35 U.S.C. 154(b) by 0 days.

(21) Appl. No.: 09/053,396

(22) Filed: Mar. 31, 1998

(51) Int. Cl.[7] .................. G06F 3/00; G06F 9/44
(52) U.S. Cl. ................ 703/27; 703/20; 703/28; 345/113; 345/327; 345/346; 345/349; 709/302
(58) Field of Search .................. 703/20, 21, 27, 703/28, FOR 500; 345/700, 326, 156, 113, 346, 349, 327, 354; 709/302; 348/569

(56) References Cited

U.S. PATENT DOCUMENTS

| | | | | |
|---|---|---|---|---|
| 5,111,413 | * | 5/1992 | Lazansky et al. | 364/578 |
| 5,202,976 | * | 4/1993 | Hansen et al. | 395/500 |
| 5,247,651 | * | 9/1993 | Clarisse | 395/500 |
| 5,265,254 | * | 11/1993 | Blasciak et al. | 395/700 |
| 5,386,371 | * | 1/1995 | Mather et al. | 364/571.08 |
| 5,450,586 | * | 9/1995 | Kuzara et al. | 395/700 |
| 5,485,600 | * | 1/1996 | Joseph et al. | 395/500 |
| 5,557,774 | * | 9/1996 | Shimabukuro et al. | 395/500 |
| 5,604,888 | * | 2/1997 | Kiani-Shabestari et al. | 395/500 |
| 5,752,008 | * | 5/1998 | Bowling | 395/500 |
| 5,778,368 | * | 7/1998 | Hogan et al. | 707/10 |
| 5,838,948 | * | 11/1998 | Bunza | 395/500 |
| 5,841,967 | * | 11/1998 | Sample et al. | 395/183.09 |
| 5,872,958 | * | 2/1999 | Worthington et al. | 395/500 |
| 5,937,154 | * | 8/1999 | Tegethoff | 395/183.06 |
| 5,953,516 | * | 9/1999 | Bonola | 395/500 |
| 6,016,563 | * | 1/2000 | Fleisher | 714/725 |
| 6,028,996 | * | 2/2000 | Sniderman et al. | 395/500.49 |

\* cited by examiner

Primary Examiner—Kevin J. Teska
Assistant Examiner—Thai Phan
(74) Attorney, Agent, or Firm—Blakely Sokoloff Taylor & Zafman LLP

(57) ABSTRACT

A technique for system-wide emulation of an embedded system. The technique includes the addition of emulation software and an intermediary operating system. The intermediary operating system is used to avoid modification of system software. The emulation software is used to generate objects that simulate hardware features of the embedded system and to signal when control features of these objects have been selected.

20 Claims, 4 Drawing Sheets

SIMULATION DEVELOPMENT TOOL FOR AN EMBEDDED SYSTEM

BACKGROUND OF THE INVENTION

1. Field of the Invention

The present invention relates to the field of software emulation. More particularly, the present invention relates to a system and method for simulating characteristics of an embedded system in order to facilitate software development.

2. Description of Art Related to the Invention

Over the last few years, there has been an increasing demand for entertainment systems working in conjunction with various types of content providers such as broadcasters and cable companies. One type of entertainment system is a digital satellite system (DSS) featuring an antenna and an integrated receiver decoder (IRD) to receive a digital bit stream. IRD is responsible for decoding the bit stream and processing the decoded bit stream to produce an output signal of an appropriate format. The output signal is sent to one or more peripherals such as a television for displaying an image. The IRD includes hardware and software responsive to control codes produced by depressing buttons on its front panel or on its remote control. The control codes are interpreted by the IRD as operational commands such as display a selected screen, tune to a selected channel and the like.

Currently, before testing software, software developers wait until the hardware manufacturer either has completed a working prototype or has completed a prototype having a text-based emulator. While a text-based emulator would allow low-level code to be tested with hardware, it does not enable system-wide testing and/or the testing of higher-level applications such as code relating to or supporting communications with a graphics user interface (GUI). Consequently, software testing is delayed which may adversely affect the release time of entertainment systems.

Also, text-based emulators do not provide an efficient testing tool because they require code compilation and repetitive loading of the compiled code during testing. Loading and repeated reloading of compiled code is required because the presence of an error condition causes the text-based emulator to crash which, in turn, requires the code to be reloaded. As a result, test time is used in an inefficient manner.

In light of this increasing demand for entertainment systems, it would be desirable to develop and test software for the IRD through system wide emulation while its hardware is concurrently being developed.

SUMMARY OF THE INVENTION

A technique for system-wide emulation of an embedded system. One technique involves the addition of emulation software and an intermediary operating system. The intermediary operating system is used to avoid modification of system software. The emulation software is used to generate objects that simulate hardware features of the embedded system and to signal when control features of these objects have been selected.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates a system and method for software emulation of the functionality of an embedded system in order to test high-level code during hardware development of the embedded system. This high-level code may include, but is not limited or restricted to code associated with a graphics user interface (GUI).

Herein, various terms are used to describe certain elements or characteristics of the present invention. For example, an "embedded system" is broadly defined as hardware having information processing capabilities. Embodiments of an embedded system include an integrated receiver decoder (IRD), a cable box, an Internet terminal (e.g., WEB TV™) and the like. A "communication line" is generally defined as any medium providing a communication path between a source and a destination. The "medium" may include one or more electrical wire(s), fiber optics, cable(s) or even wireless communications such as infrared (IR) and radio frequency (RF) signaling. A "signal" is defined as information transmitted either in a parallel or in a serial manner. A "control code" is a signal which may be transmitted as a predetermined number and sequence of digital bits, analog signals, a predetermined number and sequence of non-visible, light pulses or another type of format.

Figure 1:
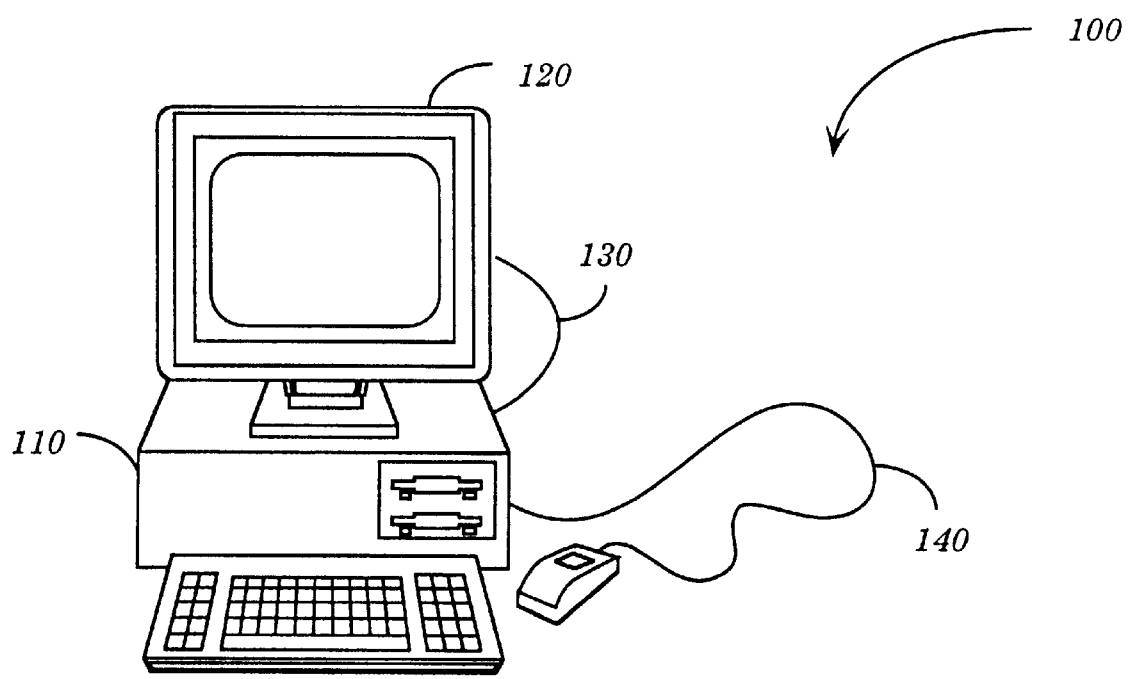
FIG. 1 is an illustrative embodiment of a software test system.

Referring to FIG. 1, an illustrative embodiment of a software test system used to test high-level code during hardware development of an embedded system is shown. The software test system 100 includes a conventional computer 110, which is connected to a monitor 120 through a communication line 130. This allows computer 110 to transfer information to monitor 120 in accordance with either an analog format or a digital format. Computer 110 may include a server, a desktop computer, or a portable computer (e.g., a laptop or hand-held). Monitor 120 may include, but is not limited or restricted to a cathode ray tube (CRT), a flat panel display (e.g., an active matrix display, liquid crystal display, etc.) or even a television adapted for use with computer 110. A control device 140 is connected to computer 110 to select and to deselect control features (e.g., simulated buttons) of one or more objects displayed on monitor 120. The control device 140 may include, but is not limited or restricted to a mouse, a track ball, a joystick, a keyboard, a keypad, a touch pad and the like.

Figure 2:
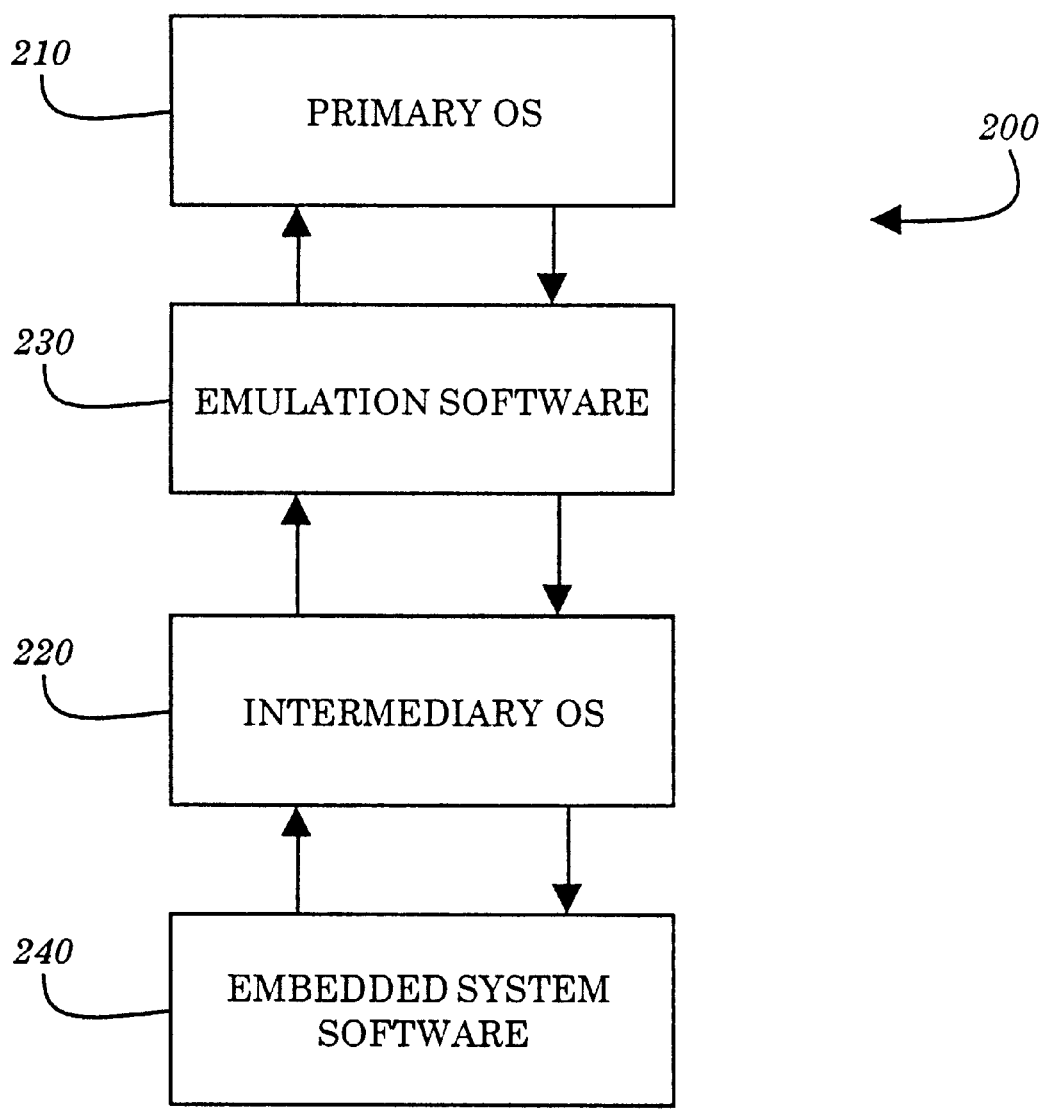
FIG. 2 is an illustrative embodiment of a platform architecture of the embedded system of FIG. 1.

Referring now to FIG. 2, an illustrative embodiment of a software layer scheme of software test system 100 is shown. In this embodiment, platform 200 comprises a primary operating system 210, an optional intermediary operating system 220, emulation software 230 and embedded system software 240 which will be used in hardware concurrently being developed. The intermediary operating system 220 is a real-time, object-oriented operating system that supports multi-tasking. Examples of intermediary operating system 220 includes Cooperative Real-time Operating System (CROP) previously developed by Sony Corporation of Tokyo, Japan. This intermediary operating system 220 has been modified to work in cooperation with a primary operating system (e.g., a Windows™ operating system such as WINDOWS 95® by Microsoft Corporation of Redmond, Wash.) and to operate as an interface between system software 240 and emulation software 230. As a result, the function call procedures associated with system software 240 would not need modification when the hardware is completed.

Figure 3:
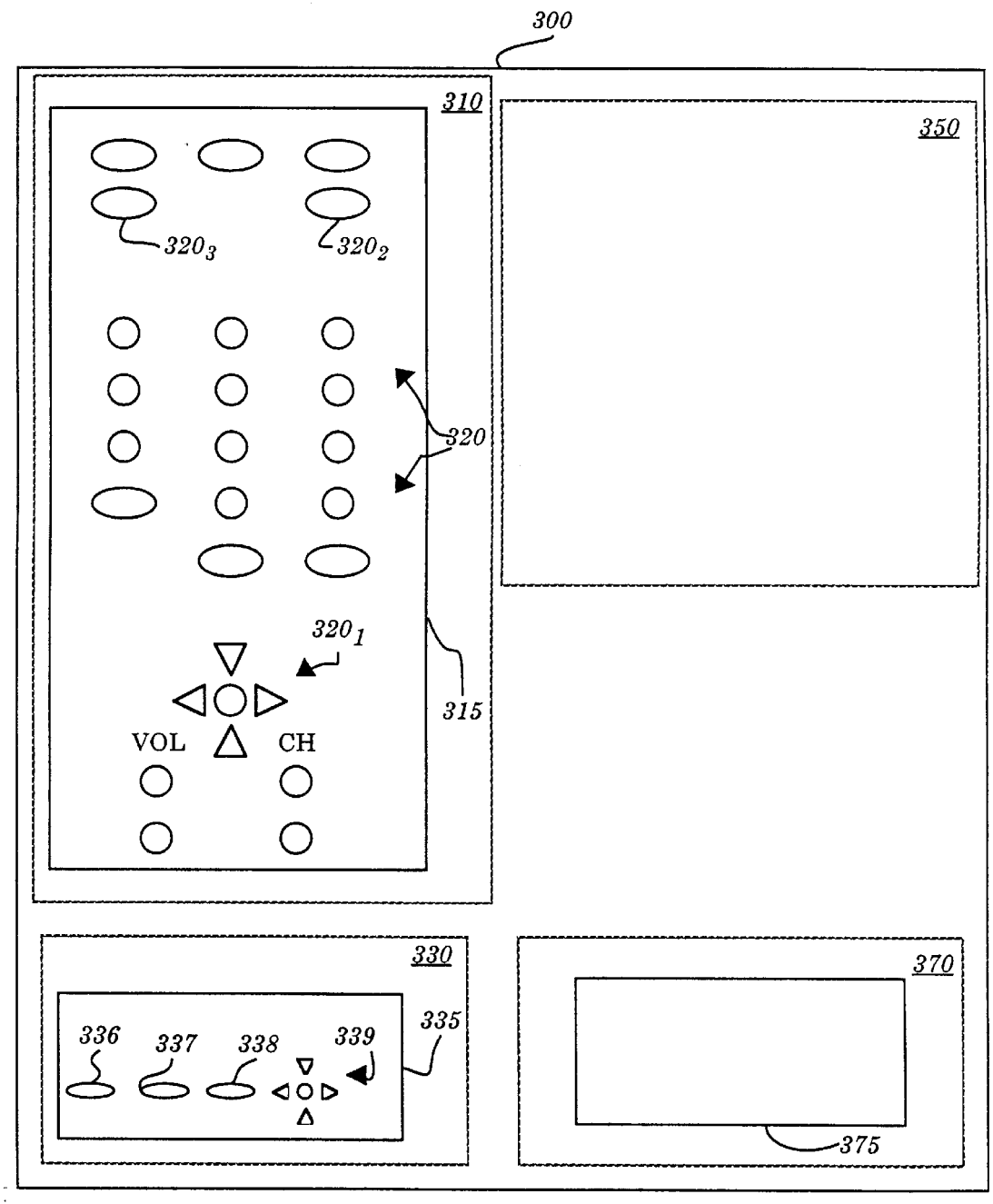
FIG. 3 is an illustrative embodiment of an interactive display produced by the platform architecture of FIG. 2.

The software layer scheme also includes emulation software 230 which is a single task that produces one or more interactive displays. In one instance, emulation software 230 produces an interactive display featuring one or more objects such as a simulated remote control and/or a simulated front panel as shown in FIG. 3. The emulation software 230 further generates other interactive displays (e.g., menu, electronic program guide, etc.) in response to selection of a particular area in a prior object as described below.

Referring now to FIG. 3, an illustrative embodiment of an interactive display 300 produced through the execution of emulation software (described below) by computer 110 is shown. The interactive display 300 provides a user interface in order to perform a system-wide test of software developed for implementation within an embedded system such as an integrated receiver decoder (IRD) or any other type of set-top box having software to decode wireless transmissions.

In this embodiment, interactive display 300 includes a plurality of windows 310, 330, 350 and 370. A first window 310 is used to display an object replicating the structural layout of a remote control of an embedded system. This replication is referred to as a "simulated remote control" 315. Upon selecting one of the areas 320 (displayed as buttons) associated with simulated remote control 315 by control device 140 of FIG. 1 for example, the emulation software produces a control code identical to the control code that would be produced by a hardware remote control after development. This control code is routed to various software tasks of system software 240 of FIG. 2 which convert the control code into a corresponding function call.

In particular, area $320_1$ represents a number of directional buttons to control movement of a virtual cursor and/or to change channels. Selection of any of the directional buttons prompts emulation software to access information stored at a particular location in internal memory of software test system 100, instead of retrieving information from an incoming bit stream via a communication port of the hardware being developed. Likewise, selection of areas $320_2$ and $320_3$ causes emulation software to produce (i) a display object of a menu screen which lists various options such as setting the color palette or font used in the object, and (ii) a program guide display object which lists a number of television shows currently broadcast or scheduled to be broadcast in the future, respectively. The information associated with each of these display objects is static (instead of dynamic) for test purposes and is retrieved from memory within software test system 100 during testing operations.

More specifically, upon selecting one of these areas (e.g., area $320_3$ featuring the program guide display object), emulation software produces a control code which would be produced by a hardware remote control after development. Examples of these control codes include, but are not limited or restricted to (i) code for displaying a selected screen such as a guide screen or main menu; (ii) code for navigating through the selected screen by selecting arrow keys; (iii) code for tune to a particular channel and the like. The simulated remote control 315 enables testing of software involved in the reception of control codes as well as the code involved in the operations produced by the control codes.

The second window 330 of interactive display 300 is further used to display an object which generally representing the structural layout of a front panel of the embedded system (referred to as a "simulated front panel") 335. As shown, simulated front panel 335 includes a plurality of areas 336–339 responsive to selection by a cursor control device attached to a computer. For example, a first area 336 represents a power button which, when selected, signals the system software 240 of FIG. 2 of a power-on or power-off condition. A second area 337 represents a select button which, when selected, signals system software that a particular object pointed to by a visual cursor is selected. A third area 338 represents a menu button which transmits a control code to the system software to produce a menu display when the menu button is selected. A fourth area 339 represents a number of directional buttons to control movement of the virtual cursor.

In addition, the third window 350 of the interactive display 300 is reserved to provide a simulated screen of a television monitor in order to test software used to produce and to generate the output signal destined for a television. The interactive display 300 further includes a fourth window 370 which provides a user-interactive debug mechanism enables a user to place test statements (e.g., print statements, breakpoints, etc.) in the code of the system software. This allows the user to monitor values of certain variables and debug the code in case an error condition occurs during execution of the system software being tested.

Figure 4:
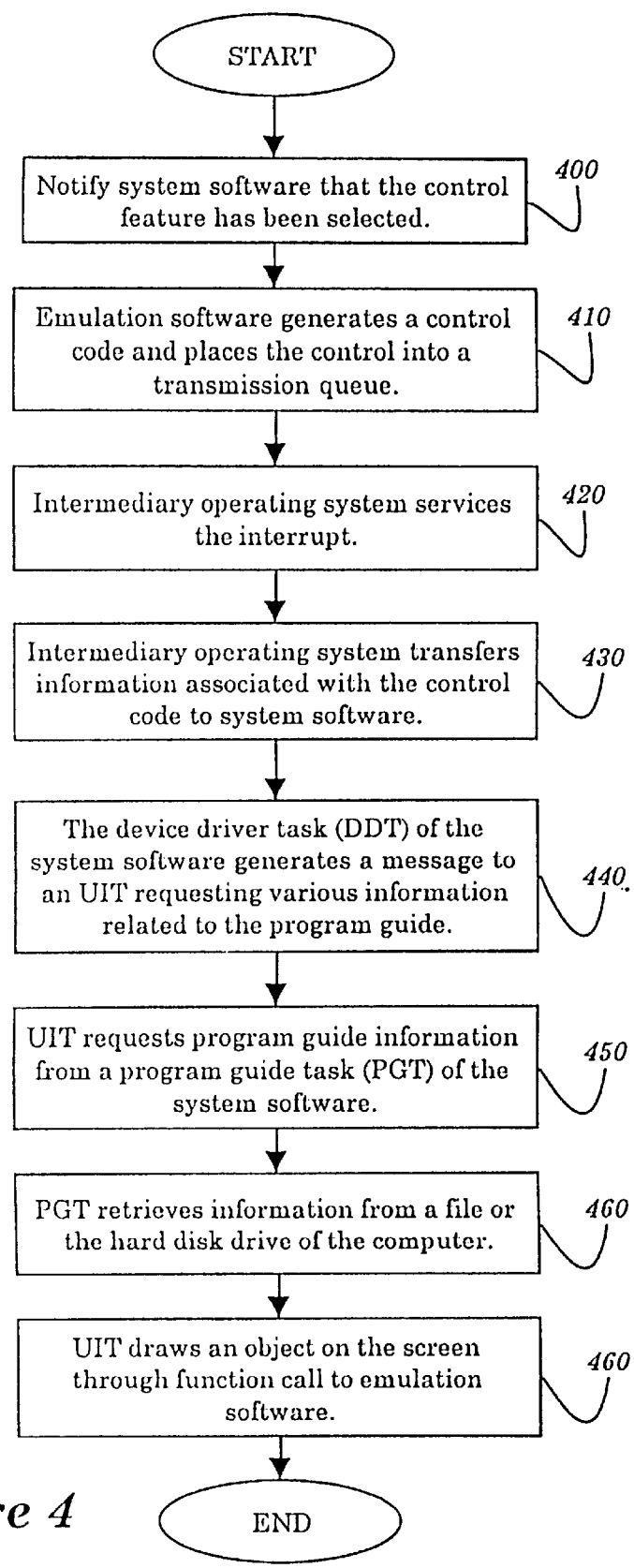
FIG. 4 is an illustrative flowchart of the operations of emulation software and system software associated with the embedded system of FIG. 1.

Referring now to FIG. 4, an illustrative flowchart of the operations of the software test system are described. After selection of a control feature of an object (e.g., selecting a simulated program guide button of simulated remote controller 315 of FIG. 3), the primary operating system (e.g., Windows 95™) notifies the emulation software that the control feature has been selected (Step 400). Consequently, the emulation software generates a control code corresponding to the selected control feature and places the control code into a transmission queue to effectively operate as an interrupt (Step 410). Thereafter, the emulation software waits for a response from the system software asynchronously to the operations performed on the control code.

The intermediary operating system services the interrupt when the control code is loaded in the transmission queue (Step 420). More specifically, upon detecting information in the transmission queue, the intermediary operating system transfers information associated with the control code to system software; namely, a device driver task (DDT) of system software (Step 430). Based on the control code received, DDT generates a message to an user interface task (UIT) requesting various information (Step 440). For example, if the area corresponding to the program guide button is selected, information related to the program guide is fetched. The UIT realizes that the program guide information has been requested, and thus, requests program guide information from a program guide task (PGT) of the system software (Step 450). PGT is capable of retrieving information from a file on the hard disk drive of the computer (Step 460).

Upon receiving the information from PGT, the UIT draws an object on the screen by making a function call to emulation software. This is normally handled by the developed hardware or its device driver; instead, in this testing technique, it is now handled by emulation software which translates the function call into a function call recognized by the primary operating system (referred to as "Window function calls"). These Window function calls are used to create a window, to draw bitmaps, to fill rectangles and the like (Step 470). Some of these Window function calls are set forth in Table A and are well known in the art.

TABLE A

| Function call | Parameters | Description |
|---|---|---|
| void_newWin | WinID winID, Word x, Word y, Word w, Word h, Word mode, Word depth, Word colors | create a hardware window |
| void_delWin | Word win | delete a hardware window |
| void_setColor | Word win, Word index, Word count, unsigned char *rgb_tbl | set the color palette |
| void_frct | Word winID, Word x, Word y, Word w, Word h, Word fcolID | draw a filled rectangle |
| void_bm | Word winID, Word x, Word y, Word w, Word h, unsigned char flag, Word d, unsigned char *c_table, unsigned char *bm | draw a bitmap |
| void_tile | WinID winID, Word x, Word y, Word w, Word h, Word transFlag, Word tileWidth, Word tileHeight, Word tileDepth, unsigned char *tilePixelOnRom | tile a bitmap |
| void_setOrder | Word win, Word order | specify which window is on top |
| void_setCoords | WinID winID, int x, int y, int width, int height | specify the location of the window |

The present invention described herein may be designed in many different embodiments and using many different configurations. As discussed herein, the technique for system-wide emulation is flexible. While the present invention has been described in terms of various embodiments, other embodiments may come to mind to those skilled in the art without departing from the spirit and scope of the present invention. The invention should, therefore, be measured in terms of the claims which follow.

What is claimed is:

1. A test system for software to be loaded within an embedded system that controls output signals to a television, comprising:
    a monitor; and
    a computer coupled to the monitor, the computer executing emulation software to generally produce and display on the monitor an emulated structural layout of a device designed to communicate with the embedded system, the emulated structural layout is user interactive to generally respond to selection of an area of the emulated structural layout to produce an emulated object for display on the monitor.

2. The system of claim 1, wherein the emulated structural layout produced by the emulation software includes a simulated remote control.

3. The system of claim 2, wherein the emulated structural layout produced by the emulation software includes a simulated front-panel.

4. The system of claim 2, wherein the emulated structural layout produced by the emulation software includes a simulated version of each and every input device of the test system.

5. The system of claim 1, wherein the emulated object includes an electronic program guide.

6. The system of claim 1, wherein the emulated object includes a menu.

7. A method comprising:
    producing a first emulated structural layout of an input device of an embedded system, the first emulated structural layout being user interactive to enable a user to control display of an emulated object on a monitor;
    selecting an area of the first emulated structural layout displayed on the monitor;
    determining a control code representative of the selected area;
    transferring the control code to software responsible for retrieving information in response to the control code; and
    displaying the emulated object on the monitor.

8. The method of claim 7, wherein prior to the displaying of the emulated object, the method further comprising converting the control code to a corresponding function call to retrieve the information responsive to the control code.

9. The method of claim 7, wherein the transferring of the control code includes placing the control code into a queue to act as an interrupt.

10. The method of claim 9, wherein the transferring of the control code further includes
    obtaining information associated with the control code; and
    transferring the information associated with the control code to a system software being tested.

11. The method of claim 10, wherein the transferring of the information associated with the control code includes retrieving requested information from memory within the embedded system.

12. The method of claim 11, wherein the requested information is static.

13. A test system for software to be loaded within an embedded system that controls output signals to a television, comprising:
    a monitor; and
    a computer connected to the monitor, the computer executing emulation software configured to generally produce and display on the monitor a simulated remote control and to generally respond to selection of an area of the simulated remote control to produce an object for display on the monitor, the simulated remote control being user interactive for enabling a user to control the embedded system.

14. The test system of claim 13, wherein the emulation software, when executed, being configured to generally produce a simulated structured layout of a front panel of the embedded system, including an object representative of a power button.

15. The test system of claim 13, wherein the emulation system, when executed, being configured to produce a simulated screen to display data would be viewed on a television screen.

16. The test system of claim 13, wherein the emulation software, when executed, being configured to produce a debug window.

17. The test system of claim 13, wherein the object includes an electronic program guide.

18. The test system of claim 13, wherein the object includes a menu.

19. The test system of claim 13, wherein the simulated structured layout of the first panel includes a menu button, when selected, to produce a menu display on the monitor.

20. The test system of claim 13, wherein the simulated structured layout of the first panel includes a directional button, when selected, to control movement of the virtual cursor.

* * * * *